Dec. 3, 1935.  E. T. LARKIN ET AL  2,022,917
BEARING
Filed May 15, 1933
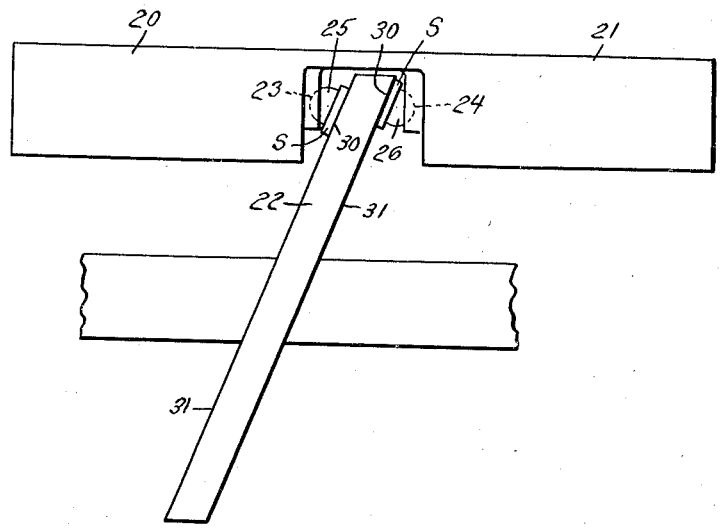

Patented Dec. 3, 1935

2,022,917

UNITED STATES PATENT OFFICE 2,022,917

BEARING

Elwood T. Larkin, Buffalo, N. Y., and Thomas L. Sherman, Norwood, Mass., assignors to Michell-Crankless Engines Corporation, New York, N. Y., a corporation of New York Application May 15, 1933, Serial No. 671,026

9 Claims. (Cl. 308—3)

This invention relates to bearings and particularly to bearings of the "slipper pad" type. Bearings such as those referred to are used in mechanism for the interconversion of reciprocating and rotary motion such as engines, pumps and like machines using slants or swash plates and are also used in thrust bearings.

Slipper pad bearings are articulated or pivoted in one of the members and are provided with plane surfaces which coact with a flat engaging surface. The body of the pivoted bearing element or slipper pad is usually constructed of steel and is provided with a spherical bearing surface which is hardened. The plane surface of the bearing is coated or provided with bearing metal such as babbitt. The spherical bearing surface has a long life and rarely requires resurfacing. However, it is frequently necessary to replace the plane bearing surface and this cannot be done effectively without special experience and equipment. Furthermore, in manufacture, the requirement that the spherical bearing surface be hardened conflicts with the characteristics desired for the effective attachment of a bearing surface of babbitt or like alloy.

This invention has for its object to provide a bearing member of the type specified so constructed that it can be manufactured economically and furthermore so constructed that the plane bearing surface can be renewed readily and at a small expense.

Further objects of the invention will appear from the following specification taken in connection with the drawing which forms a part of this application, and in which Fig. 1 is an elevational view showing slipper pad bearings used in conjunction with a slant or swash plate;

Fig. 2 is a top plan view of a slipper pad constructed in accordance with the invention;

Fig. 3 is a sectional elevation of the construction shown in Fig. 2;

Fig. 4 is a plan view of another form of slipper pad constructed in accordance with the invention;

Fig. 5 is a sectional elevation of another embodiment of the invention;

Fig. 6 is a plan view of another form of slipper pad structure embodying the invention;

Fig. 7 is a sectional elevation of the construction shown in Fig. 6 taken substantially on line 7—7 of Fig. 6;

Fig. 8 is a transverse sectional elevation of the structure shown in Fig. 6 taken substantially on line 8—8 of Fig. 6;

Fig. 9 is a sectional elevation of another form of slipper pad constructed in accordance with the invention; and Fig. 10 is a sectional elevation of a bimetallic plate for lining the plane surface of a slipper pad and embodying the invention.

The invention briefly described consists of a bearing member of the pivoted or slipper pad type having a metal plate adapted for ready attachment to and removal from the plane surface of the slipper pad for providing the bearing surface now furnished by a coating or lining of babbitt or other suitable bearing metal.

Further details of the invention will appear from the following description.

A bearing of the pivoted or slipper pad type is, as above stated, adapted for use in thrust bearings or particularly for use in converting reciprocating to rotary motion or vice versa in crankless mechanisms utilizing a slant or swash plate. In Fig. 1 there are shown a pair of pistons 20 and 21 between which is disposed a swash plate or slant 22. The pistons are provided with hemispherical sockets 23 and 24 in which are seated hemispherical bearing portions or bosses 25 and 26 formed on the slipper pads S. The slipper pads also have plane bearing surfaces 30 which coact with the flat or plane side surfaces 31 of the slant or swash plate.

As above stated, the plane bearing surface 30 is usually coated with a surface of bearing metal, such as Babbitt metal, and the hemispherical bosses are hardened, the body of the slipper pad being formed of steel.

In order to provide for more readily and quickly surfacing the plane bearing surfaces and for more ready replacement or surfacing of these surfaces the invention described and claimed in this application has been developed. The hemispherical bosses, as clearly shown in the drawing, are eccentrically disposed with relation to the slipper pad plane surface and in the form of the invention shown in Figs. 2 and 3 the advance and trailing edges 32 and 33 of the slipper pad are inclined or tapered relative to each other. The direction of rotation of the slant or swash plate is indicated by the arrow X in Fig. 2.

The plane bearing surface of the pad is formed by a bi-metallic plate 35 having a Babbitt or suitable bearing metal surface 36 for engagement with the coacting surface. The bi-metal plate may be formed of steel or bronze which, as stated, is coated with babbitt or other suitable bearing metal. The plate 35 is provided at its leading edge with a flange 37 adapted to engage the leading edge of the slipper pad and is also provided at the outer edge of the flange with a lug 38 which seats in a recess in the body and prevents relative movement of the plate on the slipper pad in the direction of rotation of the slant.

In Fig. 4 both the leading and trailing edges of the body are provided with flanges 40 and 41, each flange being provided with a lug 42 at the outer end thereof which is bent into a recess 43 formed in the slipper pad. The plate shown in Fig. 4 is assembled on the slipper pad in the direction of the arrow H.

Fig. 5 illustrates another embodiment of the invention in which the flanges 45 and 46 at the leading and trailing edges of the body are bent over the beveled and tapered leading and trailing edges 47 and 48 of the slipper pad. It will be seen that the effect of the upper beveled edge is to draw the plate into closer engagement with the body. The plate and body in Fig. 5 are tapered in a manner similar to that shown in Fig. 4.

In the form of the invention illustrated in Figs. 6, 7 and 8 the inner and outer edges A and B of the slipper body are tapered from the leading to the trailing edges of the body. The inner and outer edges are closer to each other at the leading edge of the slipper pad than at the trailing edge thereof, or in other words, the distance Y on the pad is less than the distance Z. The angle of the taper is shown at M. Flanges 50 and 51 are formed on the plate 52 at the inner and outer edges thereof and the plate is assembled on the pad by sliding movement of the plate in the direction of the arrow H shown in Fig. 6.

In Fig. 9 the slipper pad is formed with a convex outer surface 55 and the plate 56 is provided with flanges 57 and 58 which engage the inner and outer edges of the slipper pad and has a plane outer bearing surface 59.

In Fig. 10 the plate 60 has a convex surface 61 which will engage the flat bearing surface of the slipper pad, being pressed into engagement therewith by forcing the flanges 62 and 63 into engagement with the edges of the slipper pad. It will be understood that the plate 60 is formed of resilient material so that when assembled the convex surface 61 will be no longer convex, but will be in flat engagement with the end surface of the body.

It will be further understood that the bearing plate may be made solely of a metal which combines necessary strength and bearing characteristics and so need not be of bi-metal construction.

From the foregoing description it will be clear that a simple and practical construction of slipper pad has been designed and that by reason of the form of construction of the plate the flat bearing surface of the pad can be easily and quickly assembled and renewed or serviced.

Although certain specific embodiments of the invention have been particularly shown and described it will be understood that the invention is capable of modification and that changes in the construction and in the arrangement of the various cooperating parts may be made without departing from the spirit or scope of the invention, as expressed in the following claims.

What we claim is:

1. A pivoted bearing element comprising a body portion having tapered edges and a relatively thin bearing metal plate having edge portions engaging said tapered edges, said coaction between the plate edge portions and tapered edges preventing relative movement between the plate and body portion in one direction, and means coacting between the plate and body portion for preventing relative movement in the opposite direction.

2. A pivoted bearing element comprising a body portion having tapered edges and a relatively thin bearing metal plate having flanged edge portions engaging said tapered edges and lugs on said flanges engaging the tapered edges.

3. A pivoted bearing element comprising a body portion having tapered leading and trailing edges and a relatively thin bearing metal plate having edge portions engaging said tapered edges and lugs on said flanges coacting with the body portion to hold the plate against movement relative thereto in one direction.

4. A pivoted bearing element comprising a body portion having tapered inner and outer edges and a relatively thin bearing metal plate having flanged edge portions extending over and embracing said tapered edges.

5. A pivoted bearing element comprising a body portion having beveled and tapered leading and trailing edges and a relatively thin bearing metal plate having edge portions engaging said tapered edges and lugs on said flanges engaging the tapered edges.

6. A pivoted bearing element comprising a body portion having beveled and tapered inner and outer edges and a relatively thin bearing metal plate having flanged edge portions extending over and embracing said tapered edges.

7. A pivoted bearing element comprising a body portion having tapered edges and a relatively thin bi-metal plate having a surface of bearing metal and having flanged edge portions extending around and embracing the tapered edge portions of the body portion.

8. A pivoted bearing element comprising a body portion having tapered leading and trailing edges and a relatively thin bi-metal plate having a surface of bearing metal and having flanged edge portions extending around and embracing the tapered edge portions of the body portion.

9. A pivoted bearing element comprising a body portion having tapered inner and outer edges and a relatively thin bearing metal plate having flanged edge portions extending over and embracing said tapered edges, the body portion and plate being narrower at the leading edge than at the trailing edge thereof.

ELWOOD T. LARKIN.
THOMAS L. SHERMAN.